(12) United States Patent
Miriyala et al.

(10) Patent No.: US 7,024,195 B2
(45) Date of Patent: Apr. 4, 2006

(54) LOCATION BASED GROUPING FOR WIRELESS NETWORK COVERAGE AREA

(75) Inventors: Srinivas Miriyala, Fort Worth, TX (US); Jheroen P. Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 531 days.

(21) Appl. No.: 10/001,295

(22) Filed: Oct. 24, 2001

(65) Prior Publication Data
US 2003/0078042 A1 Apr. 24, 2003

(51) Int. Cl.
*H04Q 7/20* (2006.01)

(52) U.S. Cl. ............... 455/443; 455/444; 455/446; 455/452.2; 455/456.1; 455/456.5; 455/422.1; 455/435.1

(58) Field of Classification Search ......... 455/422, 455/456, 321, 33.2, 53.1, 54.1, 54.2, 56.1, 455/443, 444, 446, 456.1, 456.5, 422.1, 435.1, 455/435.3, 452.1, 452.2
See application file for complete search history.

(56) References Cited

U.S. PATENT DOCUMENTS

| | | | | |
|---|---|---|---|---|
| 5,519,706 | A * | 5/1996 | Bantz et al. | 455/435.2 |
| 6,101,387 | A | 8/2000 | Granberg et al. | |
| 6,131,028 | A | 10/2000 | Whitington | |
| 6,285,874 | B1 * | 9/2001 | Magnusson et al. | 455/456.1 |
| 6,349,206 | B1 | 2/2002 | Reichelt et al. | |
| 6,549,768 | B1 * | 4/2003 | Fraccaroli | 455/456.3 |
| 6,745,039 | B1 * | 6/2004 | Di Lalla | 455/458 |
| 2001/0031641 | A1 | 10/2001 | Ung et al. | |
| 2002/0028674 | A1 * | 3/2002 | Slettengren et al. | 455/422 |
| 2004/0002348 | A1 * | 1/2004 | Fraccaroli | 455/456.3 |
| 2004/0224682 | A1 * | 11/2004 | Kang | 455/433 |

\* cited by examiner

*Primary Examiner*—Sonny Trinh
*Assistant Examiner*—Khai Nguyen
(74) *Attorney, Agent, or Firm*—Charles W. Bethards

(57) ABSTRACT

Location-based grouping according to the present invention enables grouping of wireless network subscribers (S1–S4) based on their location within a coverage area (24, 26) and offering services based on their respective group affiliations. Specifically, the location-based grouping defines a plurality of zones (Z1–Z3), identified by coordinates, within a network coverage area (24, 26) and assigns a dynamic network subscriber group number to each zone. The location-based grouping of the present invention requires that a service provider (14) maintain both a static network subscriber group database containing network-wide subscriber subscription parameters and a dynamic network subscriber group database containing zone-specific network subscriber subscription parameters, and that a network subscriber (S1–S4) register when the network subscriber enters into one of the plurality of zones (Z1–Z3) within the network coverage area (24, 26). This registration requirement enables the location of the network subscriber (S1–S4) to be identified as being within the one of the plurality of zones (Z1–Z3) within the network coverage area (24, 26) and the consequent provision of services to the network subscriber (S1, S4) based on the static and dynamic network subscriber group subscription parameters associated with the network subscriber (S1–S4).

21 Claims, 5 Drawing Sheets

| ZONE | GROUP | $X_1$ | $Y_1$ | $X_2$ | $Y_2$ |
|---|---|---|---|---|---|
| Z1 | 10000 | 10° 10' 10" S | 12° 11' 15" W | 11° 10' 10" S | 13° 10' 10" W |
| Z2 | 10001 | 11° 10' 10" S | 13° 11' 15" W | 12° 10' 10" S | 14° 10' 10" W |
| Z3 | 10003 | 12° 10' 10" S | 14° 11' 15" W | 13° 10' 10" S | 15° 10' 10" W |

LOCATION BASED GROUPING FOR WIRELESS NETWORK COVERAGE AREA

FIELD OF THE INVENTION

The present invention relates generally to wireless network systems, and more particularly to a system and associated location-based grouping that enables network service providers to precisely and efficiently divide their respective coverage areas into zones that are smaller than the coverage areas.

BACKGROUND OF THE INVENTION

Wireless network operators have recently begun to track and deliver services to pre-defined groups of network subscriber mobile stations, such as cell phones and pagers, located within respective network coverage areas. This feature, known generally as location-based grouping, has numerous potential applications. For example, location-based grouping can enable a store owner subscriber to target and send advertising messages to network subscriber mobile stations located near the store, a company to track its service fleet and therefore provide faster and more cost effective customer service by enabling it to identify the service person closest to a customer location, or an individual to be notified if and when friends subscribing to the service are in a pre-defined coverage area location.

While the above types of applications are possible given current network operator capabilities, the applications are limited in accuracy due to the limited granularity offered by the network coverage areas. Specifically, the accuracy of the above-mentioned types of location-based grouping is limited by the size of the coverage areas defined by network transmitters. Although multiple transmitters may be used to define a particular service provider coverage area, the smallest zone that can be defined is that which the coverage area of a single transmitter can define. In addition, if members of a particular group are located across a wide area, contacting members of the particular group within a particular area may be difficult unless GPS location information is collected first before members closest to the particular area of interest can be identified.

SUMMARY OF THE INVENTION

Accordingly, the present invention provides a method of tracking a wireless network subscriber by defining a plurality of zones within a network coverage area and then assigning a dynamic network subscriber group number to the plurality of zones within the network coverage area. Both a static network subscriber group database based on network subscriber subscription parameters and a dynamic network subscriber group database based on network subscriber zone coordinates are maintained. A network subscriber must register with and provide the dynamic network subscriber number to an entity such as a network service provider when the network subscriber enters into one of the plurality of zones defined within the network coverage area. This registration requirement enables the location of the network subscriber to be identified as being within one of the plurality of zones within the network coverage area for static and dynamic network subscriber group matching purposes.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

In overview form the present disclosure concerns wireless communications systems in which location-based grouping is practiced therein or therewith. Examples of such systems include various dispatch systems including the system offered by the NEXTEL company. As further discussed below various inventive principles and combinations thereof are advantageously employed to provide location based grouping in a wireless communications system and thus better targeting of communications to subscriber devices and knowledge of the location of such devices provided these principles or equivalents are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like, if any, are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
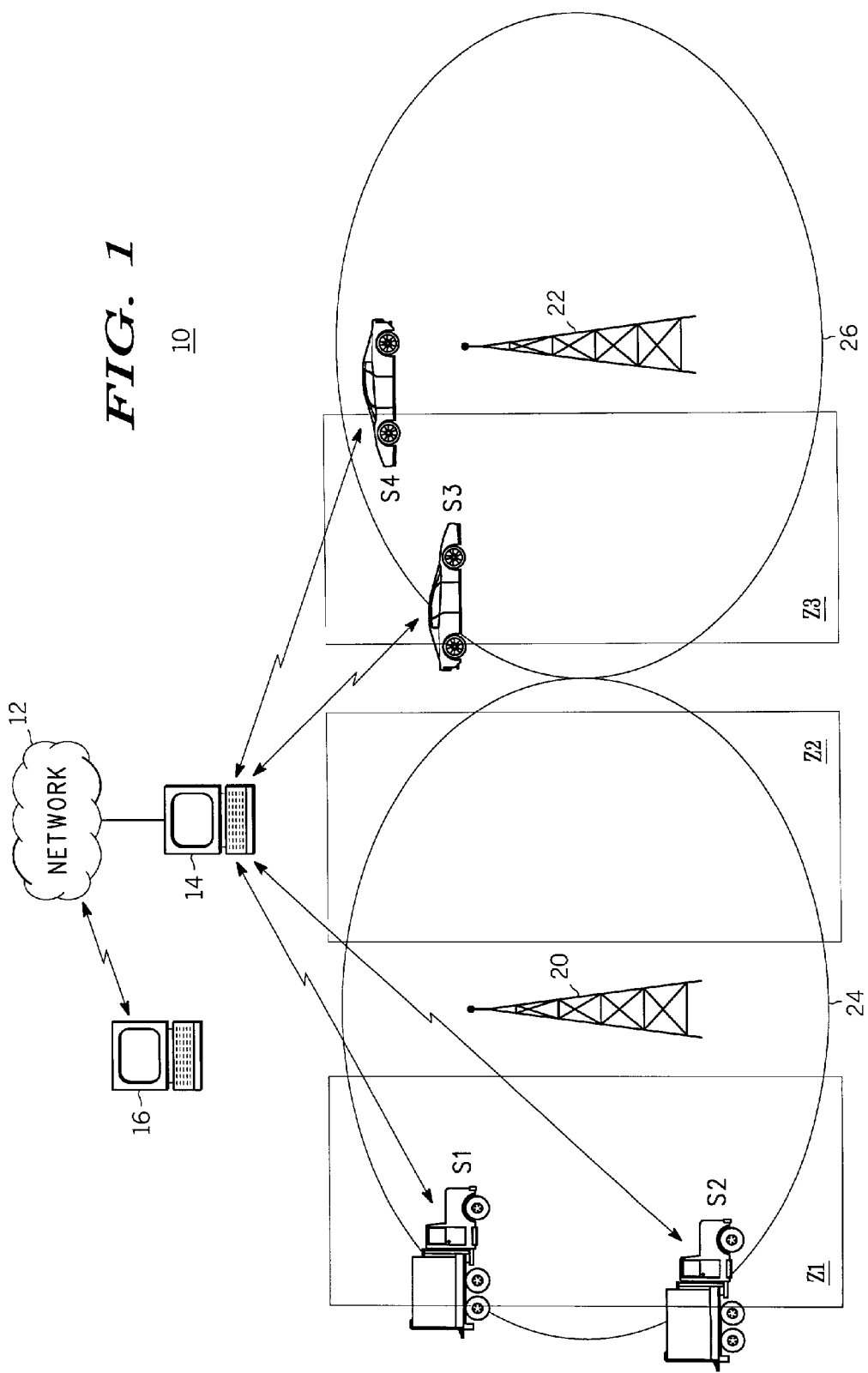
FIG. 1 is a system diagram of an exemplary wireless communications system in which the location-based grouping according to a preferred embodiment of the present invention is implemented.

The present disclosure will discuss various embodiments in accordance with the invention. The system diagram of FIG. 1 will be used to lay the groundwork for a deeper understanding of the present invention and advantages thereof. FIG. 1 in large part and at the simplified level depicted is a representative diagram of a wireless communications system 10 and will serve to explain the problems and certain inventive solutions thereto according to the present invention.

Referring now to the drawings in which like reference numerals refer to like items, FIG. 1 shows an exemplary wireless communications system 10 in which the location-based grouping according to a preferred embodiment of the present invention is implemented. The wireless communications system 10 includes a communications network 12 supporting conventional TCP/IP communication protocol and a service provider 14 that provides the location-based grouping of the present invention to entities such as a subscriber business unit shown generally at 16.

The subscriber business unit 16, which generally represents any business entity that subscribes to wireless services offered by the service provider 14, communicates with and controls associated mobile or portable subscriber devices S1–S4, such as cell phones, pagers or other similar wireless communication devices that may, but need not necessarily, be located within vehicles as shown, through communication links established between the mobile subscriber devices S1–S4 and a server at the service provider 14 via network transmitters 20, 22. As will be described below in detail, the service provider 14 is capable, through the location-based grouping according to a preferred embodiment of the present invention, of defining zones Z1–Z3 within coverage areas 22, 24 of the respective conventional wireless system transmitters 22, 24. The zones Z1–Z3 provide increased granularity for purposes of tracking the mobile subscriber devices S1–S4 and thereby enable the subscriber business unit 16 to more accurately determine the respective locations of each of the mobile subscriber devices S1–S4.

While the subscriber business unit 16 shown in FIG. 1 is depicted as a unit that tracks, for example, the respective locations and travel patterns of vehicles in a company fleet through the mobile subscriber devices S1–S4, it should be appreciated that the subscriber business unit 16 could represent any number of potential business applications. For example, the subscriber business unit could represent a large department store that transmits advertising messages to the mobile subscriber devices S1–S4 passing in close proximity to the store, or a presence notification messaging service in which an individual subscriber with a protable or mobile device can receive notification when other members of a preselected group enter the same zone as the individual subscriber. In fact, the location-based grouping of the present invention can be used in any wireless network-based application that requires information regarding the location of subscriber units within a coverage area that is higher in resolution than that provided only by the wireless system transmitters.

Referring to FIG. 1, the service provider 14 is programmed to maintain both static and dynamic network subscriber group databases. The static network subscriber group database stores services that the subscriber business unit and/or each of the mobile subscriber devices S1–S4 pays to receive. For example, mobile identification numbers of subscribers to the above-discussed presence notification-messaging feature would be placed into a static network subscriber group database dedicated to this particular type of service. Consequently, each mobile subscriber unit having an identification number in the database may have presence notification messaging capabilities regardless of its particular zone location.

The dynamic network subscriber group database stores zone specific services, because access to its contents is based solely on the location of each of the individual subscriber devices S1–S4 relative to zone coordinates. As will be discussed below, when each of the mobile subscriber devices S1–S4 must register with a zone when it enters the zone, the dynamic network subscriber group database services that each of the individual subscriber devices S1–S4 receives depends on the particular zone location of the subscriber devices S1–S4. For example, a message from ABC Department Store about a storewide clearance sale might be transmitted only to mobile subscriber devices that are in the same zone as the store, while mobile subscriber devices in an adjacent zone would not receive the message.

The service provider 14 is also programmed to divide its coverage area, represented by the transmitter coverage areas 24, 26, into the zones Z1–Z3. Specifically, referring to FIG. 2, each of the zones Z1–Z3 is identified by a dynamic group number and by zone Cartesian coordinates representing unique points on earth. For example, the zone Z1 is identified as Group 10000, and is defined by Cartesian coordinates $(X_1, Y_1)$ and $(X_2, Y_2)$ This zone and group information is preferably stored in zone-group mapping tables, such as the zone group mapping table 28 in FIG. 2, at the service provider 14 and downloaded periodically to the mobile subscriber devices S1–S4 so that the mobile subscriber devices may determine their own respective zone locations (discussed below) and then transmit information regarding their respective locations to the service provider 14. As shown in exemplary FIG. 1, the mobile subscriber devices S1 and S2 are members of Group 10000, while the mobile subscriber devices S3 and S4 are members of Group 10003.

Figures 2, 3:
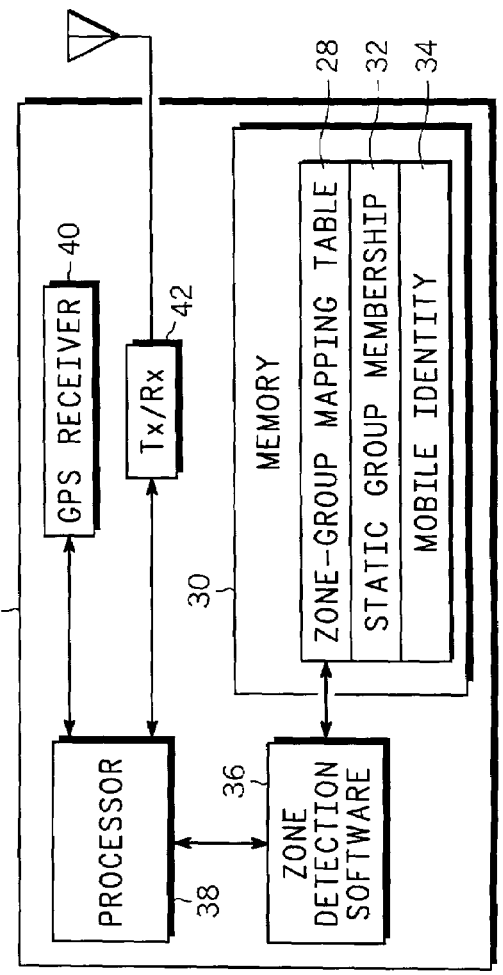
FIG. 2 is an exemplary zone group-mapping table that is downloaded to mobile subscriber devices in accordance with the location-based grouping of the present invention.
FIG. 3 is a system block diagram of an exemplary mobile subscriber device utilized in the wireless communications system shown in FIG. 1.

As shown in FIG. 3, the zone-group mapping tables such as the zone-group mapping table 28 are downloaded from the service provider 14 and stored in respective memories of each of the mobile subscriber devices S1–S4, such as the memory 30 in, for example, mobile subscriber unit S1, which will be referred to specifically for discussion purposes. A unit-specific static network subscriber group database 32 as discussed above is also stored in the memory 30 of the mobile subscriber unit S1 along with the mobile identity code 34 of the unit S1, as is well known in the art. Zone detection software 36 is programmed into a unit processor 38 for determining the zone location of the mobile subscriber unit S1 based on GPS information downloaded to the processor from a GPS receiver 40 and the dynamic zone and group information stored in the zone-group mapping table 28. The zone location is transmitted via the unit transceiver 42 to the server at the service provider 14 and then on to the subscriber business unit 16. Alternatively, the zone location could also be transmitted directly to the subscriber business unit 16 without being initially stored at the service provider 14 depending upon the particular implemented system configuration.

Figure 4:
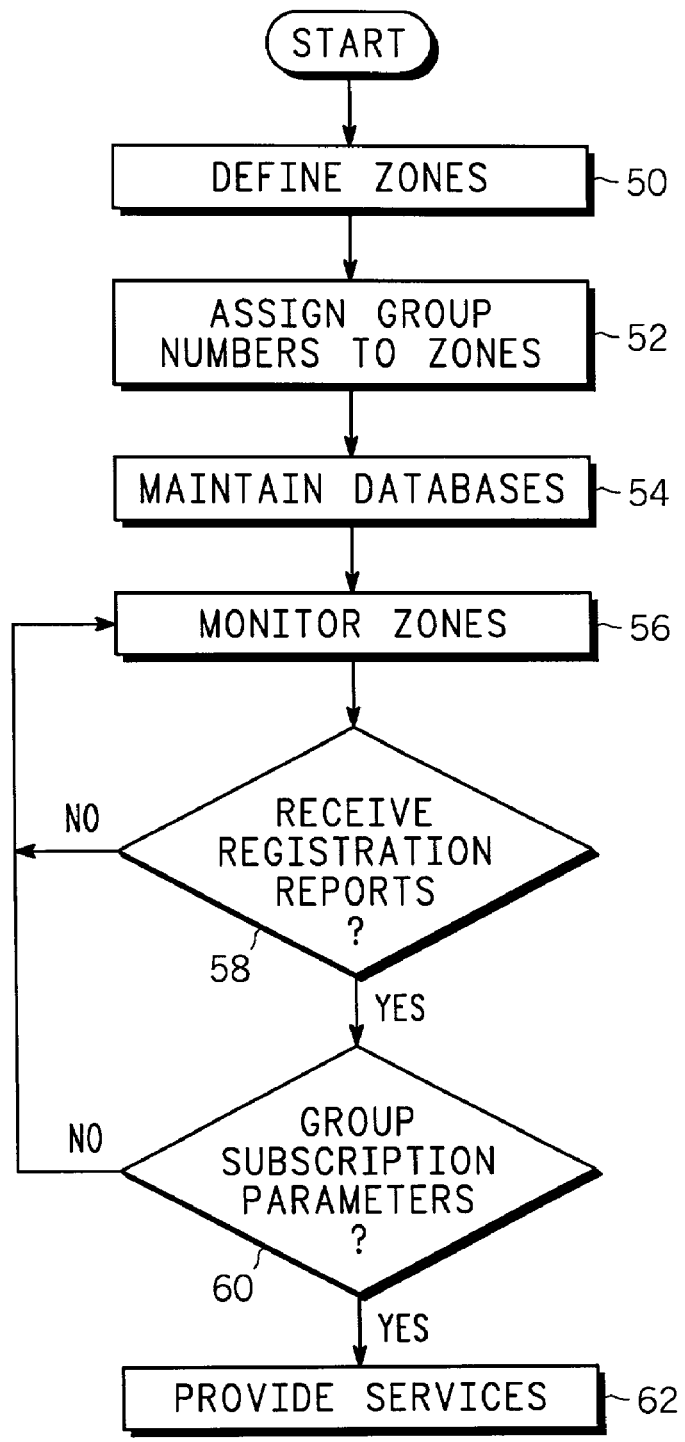
FIG. 4 is a flow diagram illustrating the location-based grouping according to a preferred embodiment of the present invention.

Referring now to FIG. 4, the location-based grouping of the present invention will be discussed in more detail, with reference being made to the exemplary wireless communications system 10 shown in FIG. 1, and specifically to the service provider 14 implementing the location-based grouping. Specifically, at 50, the location-based grouping defines zones Z1–Z3 based on Cartesian coordinates as discussed above. These zones may be periodically redefined, and therefore the zone-group mapping tables may have to be correspondingly updated, based on changing geographical and/or subscription parameters in dynamic network subscriber group databases such as, for example, changing geographical boundaries for target messaging services.

At 52, the location-based grouping assigns dynamic group numbers to the zones Z1–Z3 defined at 50, and at 54 maintains both the static and dynamic network suscriber group databases to ensure that the databases include the most recently updated subscription information from both the subscriber business unit 16 and the mobile subscriber devices S1–S4. Maintenance of a static network subscriber group database requires that the service provider 14 periodically update the static network subscriber group database to include any subscription changes made by the subscriber business unit 16 and/or the mobile subscriber devices S1–S4, as well as download the subscription changes to the affected units. Maintenance of a dynamic network subscriber group database requires only that the service provider 14 update the database to include any subscription changes made by the subscriber business unit 16 or the mobile subscriber devices S1–S4. At 56, the service provider 14 monitors the zones Z1–Z3 for registration reports generated by the mobile subscriber devices S1–S4 indicating that the units have entered one of the zones Z1–Z3. At 58, the service provider 14 queries whether any zone registration reports have been received from the mobile subscriber devices S1–S4. If the service provider 14 determines that no registration reports have been received, then it continues to monitor the zones Z1–Z3 for registration reports.

However, if at 58 the service provider 14 determines that a registration report has been received, at 60 it queries whether group service or subscription parameters have been met based on the registration report received at 58. Specifically, the service provider 14 checks the dynamic network subscriber group number from the mobile subscriber device S1 as determined from the zone-group mapping table 28 programmed into the mobile subscriber device S1 and the mobile identity 34 of the mobile subscriber device S1 against its static and dynamic network subscriber group databases to determine if the mobile subscriber device S1 meets specified location-based grouping service parameters. For example, the service provider 14 and/or the subscriber business unit 16 may only send group messages to mobile subscriber devices if the units are in a specific zone and are members of a specified static group. Therefore, the query at 60 may limit group services provided to mobile subscriber devices entering a particular zone to only those mobile subscriber devices that subscribe to a specific static network subscriber group database or databases.

If location-based grouping service parameters are not met at 60, the service provider 14 returns at 56 to again monitor the zones Z1–Z3 for registration reports. If, however, such parameters are met, at 62 the subscriber business unit 16 and/or the service provider 14 provide services to the mobile subscriber unit S1 based on the above-discussed static and dynamic network subscriber group database parameters. Subsequently, the subscriber business unit 16 and/or the service provider 14 return at 56 to monitoring the zones Z1–Z3 for registration reports.

While the location-based grouping according to a preferred embodiment of the present invention has been described above as operating in part based on GPS location information provided by the mobile subscriber devices S1–S4 to the service provider 14, the location-based grouping of the present invention can also be implemented for mobile subscriber devices without GPS capabilities.

Figure 5:
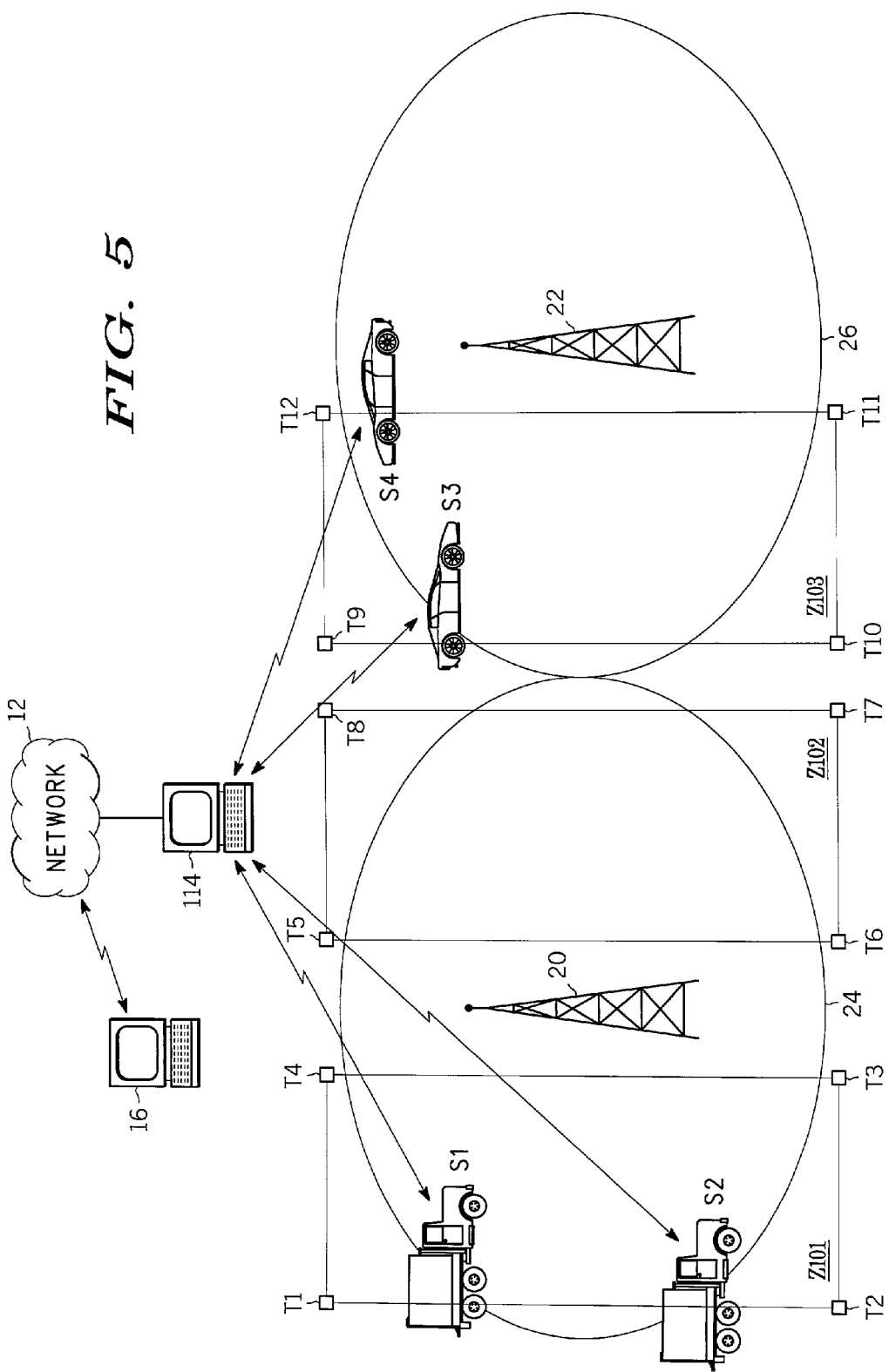
FIG. 5 is a system diagram of an exemplary wireless communications system in which the location-based grouping according to another preferred embodiment of the present invention is implemented.

Specifically, as shown in FIG. 5, a service provider 114 can arbitrarily define zones within a coverage area through strategic placement of short-range radio media, such as transceivers T1–T12 utilizing, for example, infrared or Bluetooth™ communication technology, to transmit coordinate data for the respective transmitter thus defining zones Z101–Z103 to the mobile subscriber devices S1–S4. The location-based grouping of the present invention would otherwise be implemented in a manner essentially identical to that described above in connection with FIG. 1. Namely the subscriber device compares received coordinate data from the transceiver(s) to coordinate data defining zones in a table similar to the table of FIG. 2 and if the received coordinate data is part of a zone within that table knows it is located within that zone. Therefore, the location-based grouping of the present invention can be implemented as long as the mobile subscriber devices possess the capability of receiving the coordinate data from the transceivers T1–T12 or are otherwise capable of receiving zone coordinate defining data.

Figure 6:
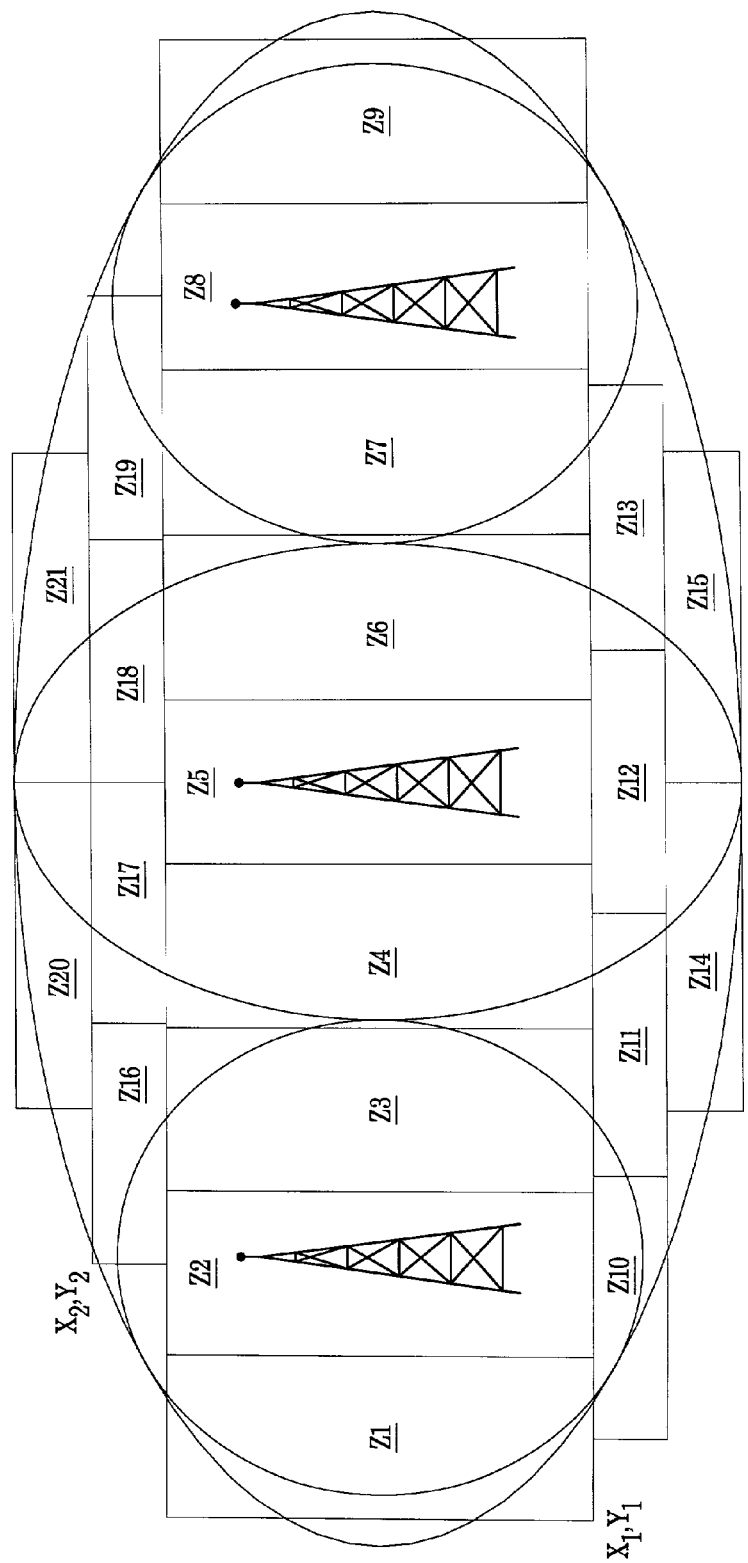
FIG. 6 is a mapping diagram showing exemplary transmitter coverage areas divided into multiple zones in accordance with the location-based grouping of the present invention.

While the location-based grouping of the present invention has been discussed above using relatively simple zone configurations, the location-based grouping is capable of realizing more complex zone groupings as well. For example, FIG. 6 illustrates a service provider zone grouping at 200 that includes zones Z1–Z21 of varying sizes and locations within the service provider area of coverage. Consequently, it should be appreciated that the location-based grouping of the present invention can be tailored to effectively target groups of mobile subscriber devices in specific geographic areas and manage static and dynamic network subscriber group databases even in areas of high population density or in high traffic areas.

In addition, as the location-based grouping of the present invention generates zone traffic information as a result of the above-discussed subscriber registration requirements, service providers can fine tune activation times for push services, such as mass advertising campaigns, during peak traffic hours in specific zones. As a result, the location-based grouping of the present invention enables advertisers to more accurately target their potential customers.

As should be appreciated from the foregoing description, the location-based grouping of the present invention enables service providers to provide the group services to specific geographic areas of coverage by enabling the service providers to create high-resolution zones within transmitter coverage areas. As a result, service providers have more control over services offered and, due to their ability to provide services on both a static and dynamic basis, are able to offer business subscribers a wider variety of services.

It should also be appreciated that the location-based grouping of the present invention is capable of being modified in numerous ways if necessary to accommodate subscriber-specific needs. For example, the location-based grouping of the present invention can be modified to support overlapping dynamic zones to enable, for example, two neighboring stores to select different zone sizes to send their respective messages. In such a case, a mobile subscriber device could belong to more than one dynamic group within a zone and should therefore be forced to de-register from a group after leaving the zone.

In addition, the location-based grouping of the present invention is capable of supporting the delivery of services to the union of a static group and a dynamic group. For example, a service provider could permit the sending of messages to subscribers of both a static group SG1 and a dynamic group DG1 but not to all subscribers of the dynamic group DG1. This extension can allow external application providers to send messages to selected members within a particular zone.

Selective registration enabling a service provider to require subscribers to a static group database to send registration messages from a particular zone is also possible. For example, a service provider can require subscribers of static groups SG1 and SG2 to register if they are in zones ZA and ZB but not in zone ZC. A zone-group mapping table can be extended to specify the static groups that are required to send registration messages for each zone.

The location-based grouping of the present invention can also be modified to enable a service provider to download different zone-group mapping tables to different subscribers. For example, a service provider can download a first zone-group mapping table to subscribers of the static group SG1 and a completely different table to subscribers of the static group SG2. This extension allows a service provider to support companies with different zoning requirements. For example, Company A might want to track its fleet of vehicles more regularly or with greater resolution than company B, and therefore would require smaller zones compared to those required by Company B.

In addition, the location-based grouping of the present invention enables location data to be provided to external business unit subscribers. In other words, a business unit subscriber can query the service provider for specific information, for example, to find out if any of its members, identified by a set of International Mobile Station Identifiers (IMSIs), are in a particular zone.

The location-based grouping of the present invention would also enable mobile subscriber zone registrations to be forwarded to external servers based on certain pre-programmed conditions. The forwarding criteria can be programmed into the service provider network equipment to support multiple external servers each with its own criteria. For example, service provider network equipment could be programmed to forward registration messages from zone ZA to the server of Company A and from zones ZB and ZC to the server of Company B.

Also, the location-based grouping of the present invention could facilitate the provision of group services, such as the receipt of group messages, to subscribers without requiring the subscribers to register with a service provider. Such an embodiment would require a subscriber unit to determine its zone and group from its current location and zone-group mapping table without sending the information to the service provider. The subscriber unit would then scan for and display messages addressed to subscribers of its group, thereby eliminating registration traffic.

Other variations in the location-based grouping of the present invention may require that a mobile subscriber unit de-register upon leaving a zone, that registration with a particular zone, static group and/or dynamic group last only for a predetermined time period, that registration be dependent upon the speed or direction of a mobile subscriber unit, or that a service provider refuse registration to certain mobile subscriber devices based on predetermined parameters such as a unit ID or group affilitiation.

While the above description is of the preferred embodiment of the present invention, it should be appreciated that the invention may be modified, altered, or varied without deviating from the scope and fair meaning of the following claims.

What is claimed is:

1. A location-based grouping method for a wireless communications system, comprising:
   defining a plurality of zones within a wireless network coverage area;
   assigning a dynamic network subscriber group number to each of the plurality of zones within the network coverage area;
   maintaining both a static network subscriber group database containing network-wide subscriber subscription parameters and a dynamic network subscriber group database containing zone-specific network subscriber subscription parameters; and
   requiring a network subscriber to register and provide the dynamic network subscriber group number when the network subscriber enters into one of the plurality of zones within the wireless network coverage area to thereby identify a location of the network subscriber as being within the one of the plurality of zones within the network coverage area and to consequently provide services to the network subscriber based on the static and dynamic network subscriber group subscription parameters associated with the network subscriber.

2. The method of claim 1, wherein the requiring a network subscriber to register and provide the dynamic network subscriber group number when the network subscriber enters into one of the plurality of zones within the wireless network coverage area comprises requiring the network subscriber to provide GPS-based location information when the network subscriber enters the one of the plurality of zones within the network coverage area to thereby identify the location of the network subscriber.

3. The method of claim 2, further comprising periodically downloading a zone group mapping table to the network subscriber to enable the network subscriber to determine its location within the one of the plurality of zones within the network coverage area based on the GPS-based location information and corresponding information in the zone group lookup table.

4. The method of claim 3, further comprising requiring the network subscriber to provide the corresponding information in the zone-group mapping table to thereby identify the location of the network subscriber.

5. The method of claim 1, further comprising requiring the network subscriber to deregister when the network subscriber leaves the one of the plurality of zones within the network coverage area.

6. The method of claim 1, further comprising transmitting zone-specific messages to the network subscriber after the requiring a network subscriber to register and provide the dynamic network subscriber group number when the network subscriber enters into one of the plurality of zones within the wireless network coverage area.

7. The method of claim 6, wherein the transmitting of zone-specific messages to the network subscriber comprises transmitting zone-specific messages to the network subscriber only when the network subscriber belongs to both a predetermined static network subscriber group and a dynamic network subscriber group corresponding to the one of the plurality of zones within the network coverage area.

8. The method of claim 1, wherein the requiring a network subscriber to register and provide the dynamic network subscriber group number when the network subscriber enters into one of the plurality of zones within the wireless network coverage area comprises requiring a plurality of network subscribers to register when each of the plurality of network subscribers enters respective ones of the plurality of zones within the network coverage area to thereby identify a location of each of the plurality of network subscribers as being within the respective ones of the plurality of zones within the network coverage area and to consequently provide services to the plurality of network subscribers based on static and dynamic network subscriber group subscription parameters associated with each of the plurality of network subscribers.

9. The method of claim 1, further comprising notifying the network subscriber when one or more subscribers belonging to a static network subscriber group matching that of the network subscriber are also registered within the one of the plurality of zones within the network coverage area.

10. The method of claim 1, further comprising transmitting an alert to a subscriber controlling entity when the one of the plurality of zones within the network coverage area entered into by the network subscriber varies from a set zone entry pattern authorized by the subscriber controlling entity.

11. A location-based grouping method for a wireless communications system, comprising:
defining a plurality of zones within a wireless network coverage area;
assigning a dynamic network subscriber group number to each of the plurality of zones within the network coverage area;
maintaining both a static network subscriber group database containing network-wide subscriber subscription parameters and a dynamic network subscriber group database containing zone-specific network subscriber subscription parameters;
transmitting zone coordinate data to a network subscriber via a short-range wireless communication link; and
requiring a network subscriber to register and provide the dynamic network subscriber group number when the network subscriber enters into one of the plurality of zones within the wireless network coverage area to thereby identify a location of the network subscriber as being within the one of the plurality of zones within the network coverage area and to consequently provide services to the network subscriber based on the static and dynamic network subscriber group subscription parameters associated with the network subscriber.

12. The method of claim 11, wherein the transmitting of zone coordinate data to a network subscriber via a short-range wireless communication link comprises transmitting zone coordinate data to a network subscriber via at least one of a Bluetooth™ and an infrared signal transmitting device.

13. The method of claim 11, further comprising requiring the network subscriber to deregister when the network subscriber leaves the one of the plurality of zones within the network coverage area.

14. The method of claim 11, further comprising transmitting zone-specific messages to the network subscriber after the requiring a network subscriber to register and provide the dynamic network subscriber group number when the network subscriber enters one of the plurality of zones within the wireless network coverage area.

15. The method of claim 14, wherein the transmitting of zone-specific messages to the network subscriber comprises transmitting zone-specific messages to the network subscriber only when the network subscriber belongs to both a predetermined static network subscriber group and a dynamic network subscriber group corresponding to the one of the plurality of zones within the network coverage area.

16. The method of claim 11, wherein the requiring a network subscriber to register and provide the dynamic network subscriber group number when the network subscriber enters into one of the plurality of zones within the wireless network coverage area comprises requiring a plurality of network subscribers to register when each of the plurality of network subscribers enters respective ones of the plurality of zones within the network coverage area to thereby identify a location of each of the plurality of network subscribers as being within the respective ones of the plurality of zones within the network coverage area and to consequently provide services to the plurality of network subscribers based on static and dynamic network subscriber group subscription parameters associated with each of the plurality of network subscribers.

17. The method of claim 11, further comprising notifying the network subscriber when one or more subscribers belonging to a static network subscriber group matching that of the network subscriber are also registered within the one of the plurality of zones within the network coverage area.

18. The method of claim 11, further comprising transmitting an alert to a subscriber controlling entity when the one of the plurality of zones within the network coverage area entered into by the network subscriber varies from a set zone entry pattern authorized by the subscriber controlling entity.

19. A wireless communications network tracking system, comprising:
a plurality of network transmitters each for defining a network coverage area; and
a network service provider for dividing the network coverage area into a plurality of network coverage zones, for maintaining both a static network subscriber group database containing network-wide subscriber subscription parameters and a dynamic network subscriber group database containing zone-specific network subscriber subscription parameters, and for receiving registration information from a network subscriber programmed to report thereto when the network subscriber enters into one of the plurality of zones within the network coverage area to thereby identify a location of the network subscriber as being within the one of the plurality of zones within the network coverage area and to consequently provide services to the network subscriber based on the static and dynamic network subscriber group subscription parameters associated with the network subscriber.

20. The system of claim 19, further comprising a business unit having a plurality of network subscribers, the business unit for purchasing tracking services from the network service provider to enable the business unit to receive static and dynamic network subscriber group tracking information from the network service provider.

21. The system of claim 19, further comprising a plurality of short range, low power transmitting devices strategically placed throughout the network coverage area to define the plurality of network coverage zones.

* * * * *